US006995964B2

(12) United States Patent
Plemmons et al.

(10) Patent No.: US 6,995,964 B2
(45) Date of Patent: Feb. 7, 2006

(54) COMBINATION-TYPE MOTOR CONTROL WITH EXTENDED CURRENT RANGE

(75) Inventors: Roger Alan Plemmons, Asheville, NC (US); John Herman Blakely, Weaverville, NC (US); Gregory A. Helton, Asheville, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 10/955,705

(22) Filed: Sep. 30, 2004

(65) Prior Publication Data

US 2005/0270708 A1 Dec. 8, 2005

Related U.S. Application Data

(62) Division of application No. 10/861,564, filed on Jun. 3, 2004.

(51) Int. Cl.
*H02H 5/04* (2006.01)

(52) U.S. Cl. .............................................. 361/31

(58) Field of Classification Search .................. 361/23, 361/24, 25, 31, 93.1, 93.8
See application file for complete search history.

(56) References Cited

U.S. PATENT DOCUMENTS

| | | | | |
|---|---|---|---|---|
| 4,967,304 A * | 10/1990 | Dougherty | .................. | 361/31 |
| 5,436,784 A * | 7/1995 | Schweitzer et al. | ........... | 361/25 |
| 5,793,595 A * | 8/1998 | Schweitzer et al. | ........... | 361/97 |
| 6,204,642 B1 * | 3/2001 | Lawson et al. | ............... | 322/20 |

* cited by examiner

*Primary Examiner*—Ronald Leja
(74) *Attorney, Agent, or Firm*—Patrick S. Yoder; Alexander M. Gerasimow

(57) ABSTRACT

A motor control technique is disclosed in which a first algorithm controls interruption of power to a motor in a first current range. A second algorithm controls interruption of power in a second, higher current range. The algorithms may be adapted to specific motor sizes, ratings or classes. The extended range may extend from a transition point (e.g., 6–10 times the FLC of the motor) to an upper limit. The upper limit may be determined based upon a current rating of an instantaneous trip device.

19 Claims, 6 Drawing Sheets

COMBINATION-TYPE MOTOR CONTROL WITH EXTENDED CURRENT RANGE

The present application is a Divisional of U.S. patent application Ser. No. 10/861,564, filed on Jun. 3, 2004, and entitled "Extended Trip Range Motor Control System And Method".

BACKGROUND

The present invention relates generally to the field of protective devices for electrical loads and circuitry, and more particularly to a technique for extending a range of overload protection in a device serving loads of substantially different rating.

In the field of electrical devices and circuits, many arrangements have been proposed and are currently in use for providing power and for protection of loads. For example, for motor protection applications, protective circuitry typically includes fuses, circuit breakers, thermal overload protective devices, and so forth. In a typical application, the protective circuitry is specifically adapted for the size of the load, that is, for its current rating. Motor circuitry, for example, may be protected by reference to the motor full load current rating, with overload protection being provided by reference to a multiple of the full load current rating, and instantaneous tripping being provided by a specifically-selected electromagnetic device, such as a circuit breaker. The circuit breaker provides for a higher current tripping level, although faster tripping, with a gap in currents being provided between the trip current of the thermal overload device and the instantaneous trip device.

While arrangements such as these afford adequate protection of motors, they are not without drawbacks. For example, specific components and circuits are typically designed and selected for each type and rating of load. The resulting arrangements require a number of separate components of different ratings, assembled in a large number of combinations. Elevated manufacturing, stocking, and associated costs may thus result, particularly where a user has many different motors of different ratings, or where a supplier provides protective circuitry to many different users having a range of motor products.

It would be advantageous, therefore, to provide protective circuitry that can be employed with a broader range of loads, while providing adequate protection from both thermal overload and high currents that would normally require an instantaneous-type trip. Significant challenges exist, however, with such devices in view of the current approach of selecting the instantaneous trip device based upon the particular load being serviced.

BRIEF DESCRIPTION

The present technique provides a novel arrangement for extended higher current overload protection capable of servicing loads of a wide range of ratings. The technique may be applied to a range of motor types and sizes. In accordance with aspects of the technique, multiple algorithms are employed to interrupt power to a motor in different current ranges. In a first range, for example, a first algorithm interrupts power in accordance with a first algorithm. An extended range is then defined in which a second algorithm governs interruption of power. The extended range provides for utilization of the same components (e.g., a circuit interrupter or contactor) for multiple different motor sizes and ratings, with the operation being effectively controlled by the software implemented by the algorithms.

DRAWINGS

These and other features, aspects, and advantages of the present invention will become better understood when the following detailed description is read with reference to the accompanying drawings in which like characters represent like parts throughout the drawings, wherein.

Figure 6:
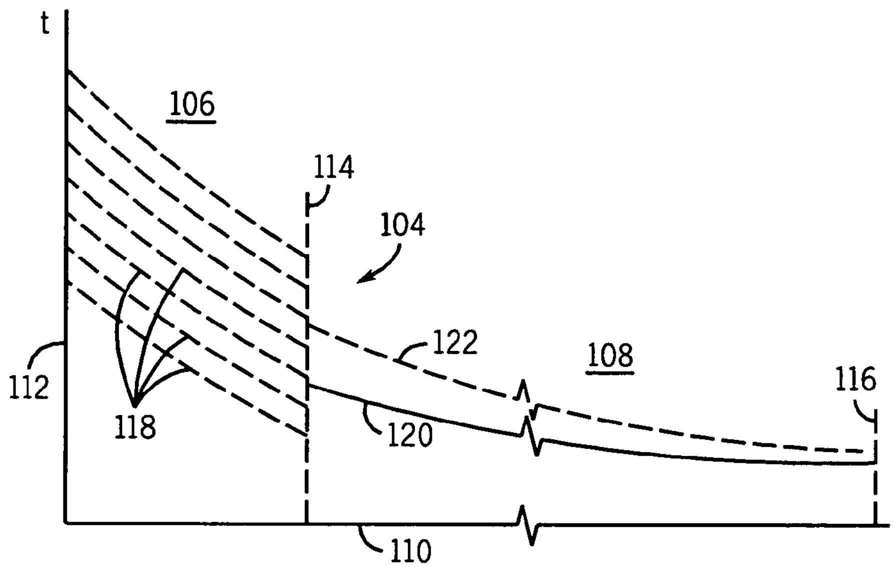
Figure 7:
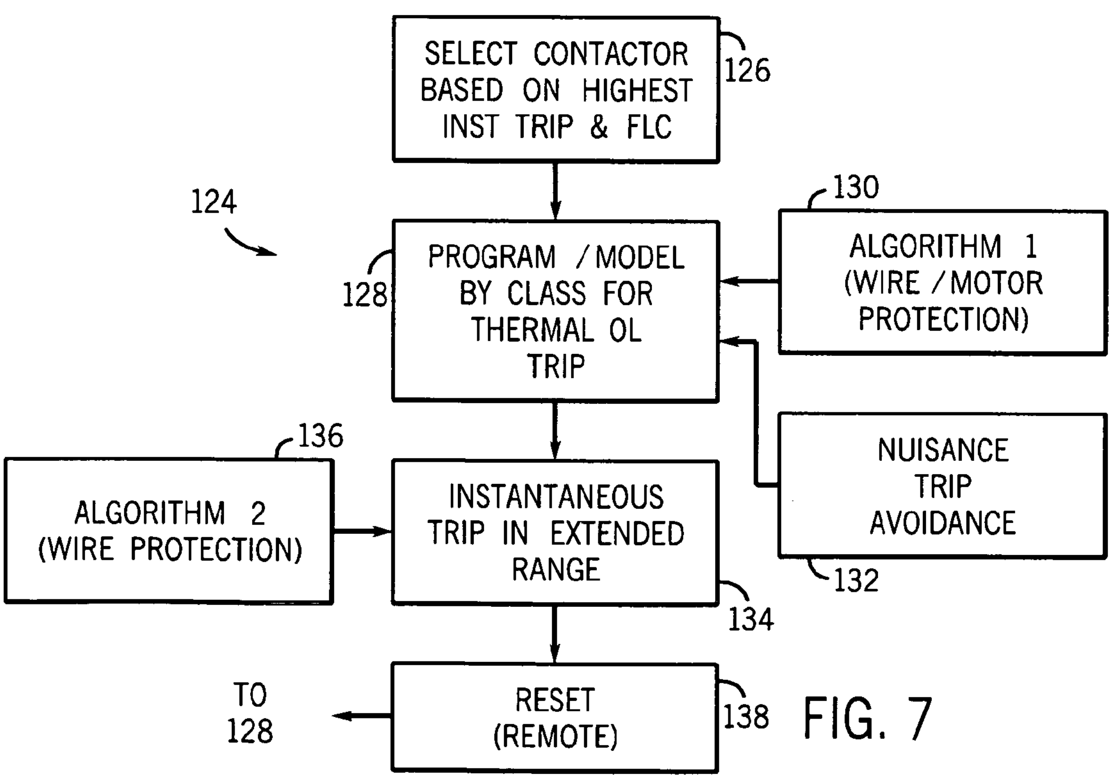

FIG. 6 is a graphical representation of motor trip curves illustrating a manner in which the circuitry of the preceding figures may operate to extend a range of tripping and to apply algorithms specifically designed for extending the range; and FIG. 7 is a flow chart illustrating exemplary logic in the design and implementation of an extended range component protection device in accordance with aspects of the present technique.

DETAILED DESCRIPTION

Figure 1:
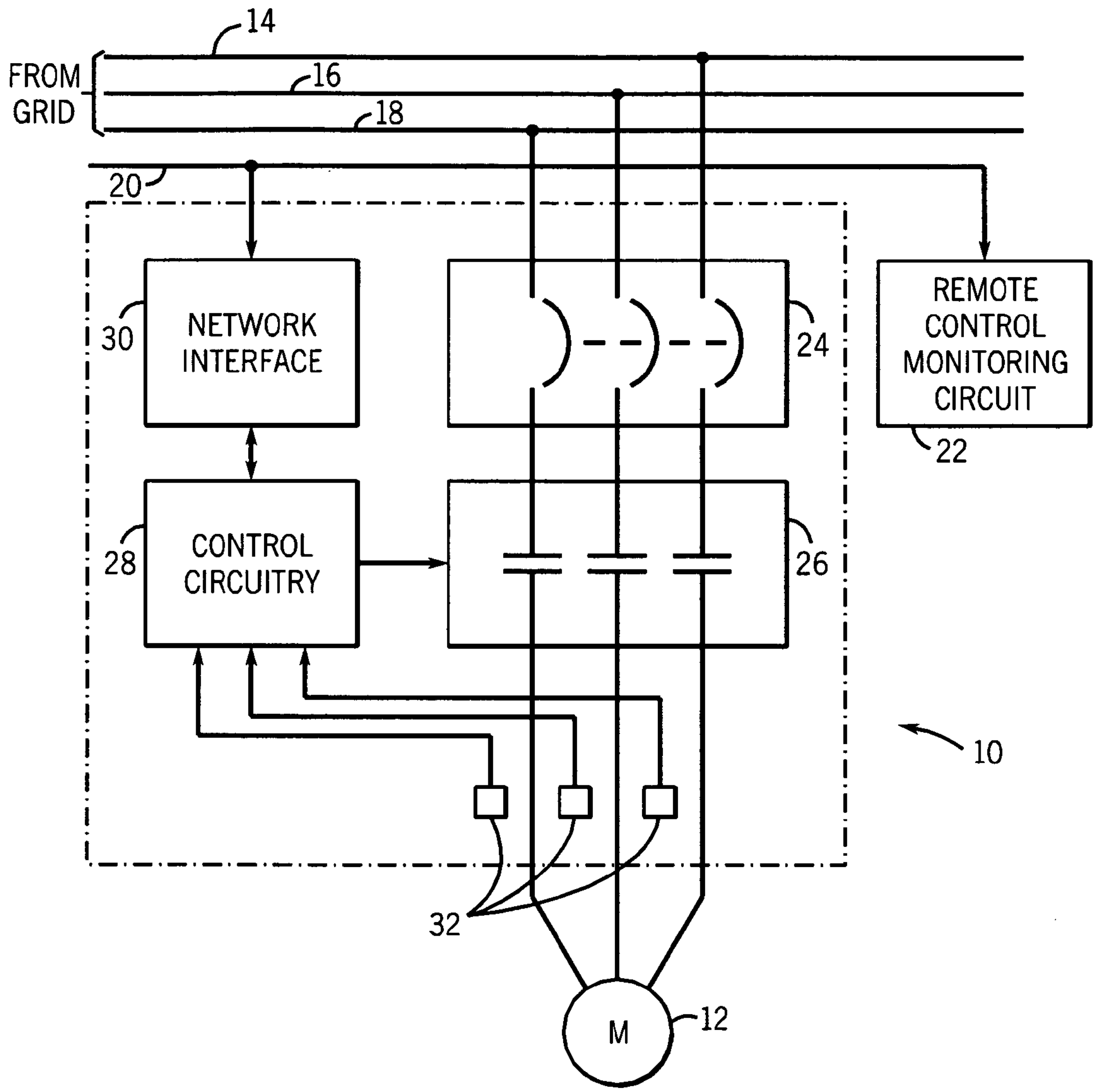
FIG. 1 is a diagrammatical view of an electrical device protective circuit coupled to line power and to a network for selectively interrupting current to a load.

Turning now to the drawings, and referring first to FIG. 1, a protective device or system 10 is illustrated diagrammatically for providing power to and for protecting a load, such as an electric motor 12. In the illustrated embodiment, the device 10 is a three-phase device configured to deliver a three-phase power to the motor from power conductors 14, 16 and 18 which are typically coupled to the power grid. In a typical application, the protective device 10 can provide power directly from the grid to the motor, or the device may be configured for providing controlled power to the motor, such as for soft starting the motor or for driving the motor at variable frequencies (i.e. an inverter drive). Device 10 is also coupled to a network 20, such as an industrial control and monitoring network. Such networks may operate in accordance with any suitable network protocol such as well-known DeviceNet, ControlNet protocols or any other suitable protocol. As will be appreciated by those skilled in the art, such networks typically permit for the exchange of data between networked devices. In the present context, a remote control and monitoring circuit 22, such as a programmable logic controller, remote computer, or any other suitable device, may be coupled to the network for monitoring operation of the protective device 10, resetting the device, where appropriate, and so forth. Interactions between the remote control and monitoring circuit 22 and device 10 will be discussed in greater detail below.

In the embodiment illustrated in FIG. 1, device 10 includes an instantaneous trip device 24, such as an electromagnetic overload device. As discussed in greater detail below, the device 10 is configured to service a wide range of loads, much wider than conventional motor starters and protective circuitry. Accordingly, and also as described in greater detail below, the instantaneous trip device 24 is selected to open the circuits between the power conductors 14, 16 and 18 and the load at a substantially high current, as compared to the normal full load current of certain of the devices that can be coupled to the protective device as loads. Protective device 10 further includes a contactor 26 which can also serve to open the conductive paths between the phase conductors and the load, under the control of control circuitry 28. As will be discussed in greater detail below, the control circuitry 28 may regulate opening and closing of the contactor 26 in different current ranges, depending upon the rating of the load or motor 12 to which the device is coupled. That is, below certain current ratings, the control circuitry 28 may cause the contactor 26 to open, thereby tripping the device, based upon a first algorithm as determined by the rating of the load. In a higher current range, the control circuitry 28 causes the contactor to open to protect the conductors used to link the phase conductors to the load. In this range of operation, the control circuitry 28 and contactor 26 effectively implement and instantaneous trip regime via software.

The control circuitry 28 is preferably linked to the network 20 by a network interface 30. The network interface 30 may provide for signal conditioning, power for certain of the circuitry of the control circuitry 28, and generally serves to interface the control circuitry via the network protocol with other devices on the network 20. In particular, the network interface 30 may permit resetting of the contactor 26 remotely, such as by control signals received from the remote control and monitoring 22. The protective device 10 further includes sensors, as indicated at reference numeral 32. In a present embodiment, sensors 32 are current sensors, such as current transformers. Other types of sensors, may, of course, be employed, particularly for sensing currents applied to the motor 12. In appropriate situations, sensors 32 may also include voltage sensors. The sensors may operate in accordance with any suitable physical phenomenon such as Hall-effect sensors.

As noted above, the protector device 10, and particularly the control circuitry 28, in conjunction with the contactor 26 and the instantaneous trip 24, permit application of power to the load coupled to the device. In accordance with aspects of the present technique, two separate types of algorithms or controlled methodologies are implemented. In a first methodology, a trip range is defined below a desired multiple of the motor full load current rating. Above this full load current rating multiple, a separate and parallel algorithm permits tripping that imitates an instantaneous trip device. The instantaneous trip device 24 may thus be selected for a highest full load current in a range of devices to which the protector device 10 is designed to operate. However, because this multiple may be much higher than desired for certain of the devices to which the protective device 10 is coupled, the algorithm causes trips at a lower current multiple within the extended range.

The particular operation of the control circuitry designed to permit such operation is described in greater detail below. However, it should be noted here that the preferred algorithms for operation of the control circuitry in a present embodiment permit the use of smaller wire than has previously been employed for many applications for which the protective device is designed. That is, modeling and algorithm design described below is particularly adapted to permit the use of 16 AWG wire for conductors coupling the protective device 10 to the grid conductors, and for conductors extending to the load. It has been found that the use of 16 AWG wire greatly facilitates installation and servicing of the device. Such standardization was heretofore impossible given the ratings of devices used for larger loads.

Figure 2:
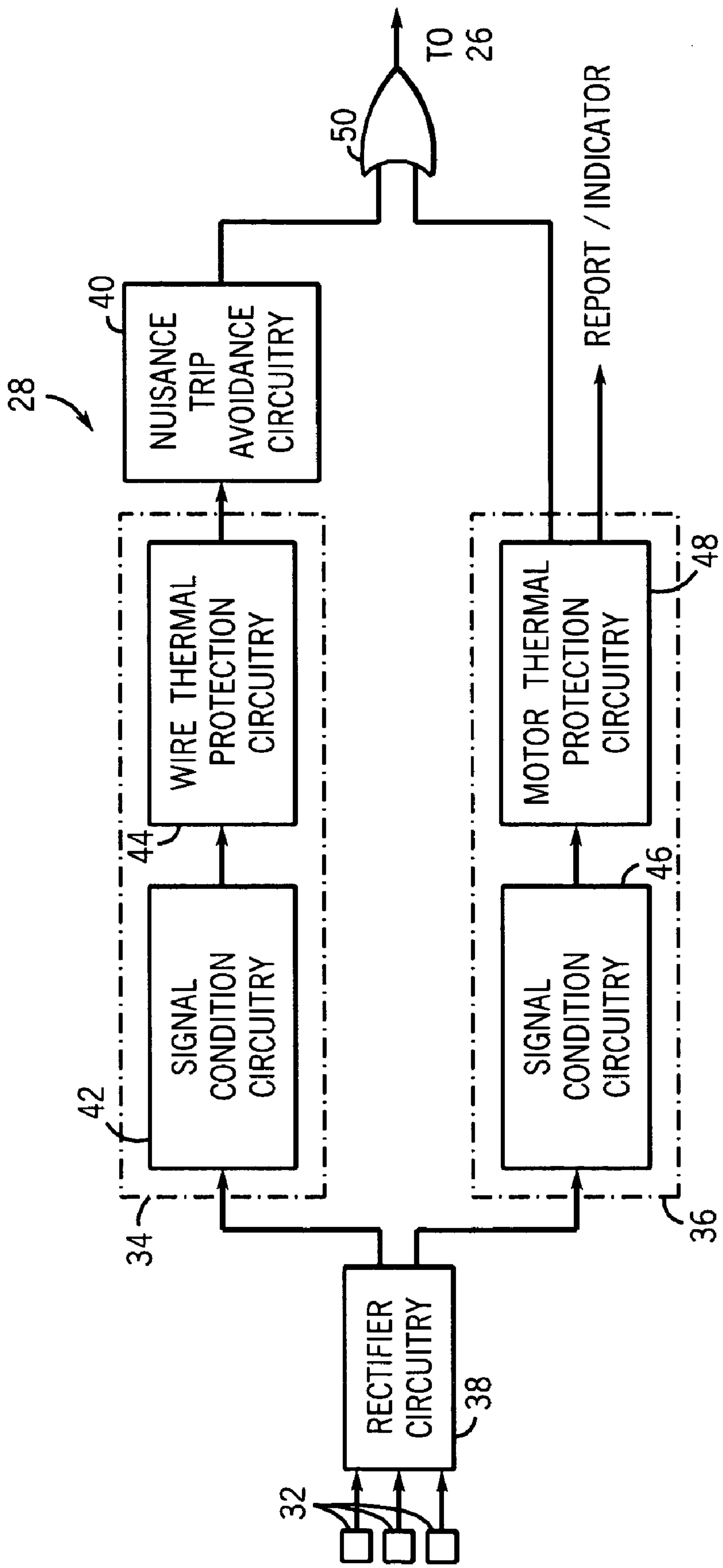
FIG. 2 is a diagrammatical representation of certain of the control circuitry associated with the arrangement of FIG. 1.

FIG. 2 illustrates certain functional circuitry of the control circuitry 28. As indicated above, the control circuitry implements algorithms for protection of the load to which the device is coupled. In particular, the circuitry implements a wire protection path 34 and a load or motor protection path 36. While the instantaneous trip device 24 (see FIG. 1) is provided for tripping at very high currents or full load current multiples (the particular multiple depending upon the rating of the device to which the circuitry is coupled), the instantaneous trip device 24 is preferably selected based upon the highest current rating of the family of devices to which the protective device 10 is designed to be coupled. That is, for devices with a higher current rating, the instantaneous trip device will provide a lower full load current multiple trip point. For lower-rated devices, however, the instantaneous trip device will provide a much higher full load current rating multiple for tripping. To accommodate this situation, the control circuitry 28 illustrated in FIG. 2, permits protection of the motor and wiring in a first range of operation, and particularly protects the wiring in an extended range over which an instantaneous trip device would operate in conventional arrangements.

In the diagrammatical view of FIG. 2, the wire protection path 34 and motor protection path 36 are coupled at downstream of a rectifier circuit 38 which receives input from the current sensors 32. To permit the use of certain current sensors and the extended overload range, a nuisance trip avoidance circuit 40 is provided downstream of the wire protection path 34. That is, as will be appreciated by those skilled in the art, signals from the current sensors may degrade at higher current levels. Thus, time constants used in the models implemented by the circuitry (discussed in greater detail below) may provide for faster tripping than in conventional devices. Such faster tripping, then, will affect the tripping at lower currents and could cause nuisance tripping. Such nuisance tripping can result from motor asymmetry transients, particularly upon startup, as discussed in greater detail below, the nuisance trip avoidance circuitry 40 permits the use of time constants that would otherwise result in faster tripping, while avoiding nuisance tripping due to such asymmetries.

In the diagrammatical representation of FIG. 2, the wire protection path 34 and the motor protection path 36 appear to be generally similar. That is, the wire protection path 34 includes signal condition circuitry 42 and wire thermal protection circuitry 44. Similarly, the motor protection path 36 includes signal conditioning circuitry 46 and motor thermal protection circuitry 48. As discussed below, the circuitry, in fact, act on different signal inputs from the rectifier circuitry 38, and model heating of the wiring and load in different manners, and based upon different input parameters. Tripping of the contactor 26 (see FIG. 1) may be based upon either the modeling provided by the wire protection path 34 or the motor protection path 36. This permits implementation of algorithms for tripping in the two separate ranges as discussed in greater detail below. The arrangement also permits the use of smaller wiring (e.g. 16 AWG) and standardization upon the desired wiring. In the embodiment illustrated in FIG. 2, output of the nuisance trip avoidance circuitry 40 and of the motor thermal protection circuitry 48 are combined in an "OR" device 50 which produces a trip signal for the contactor 26.

Figure 3:
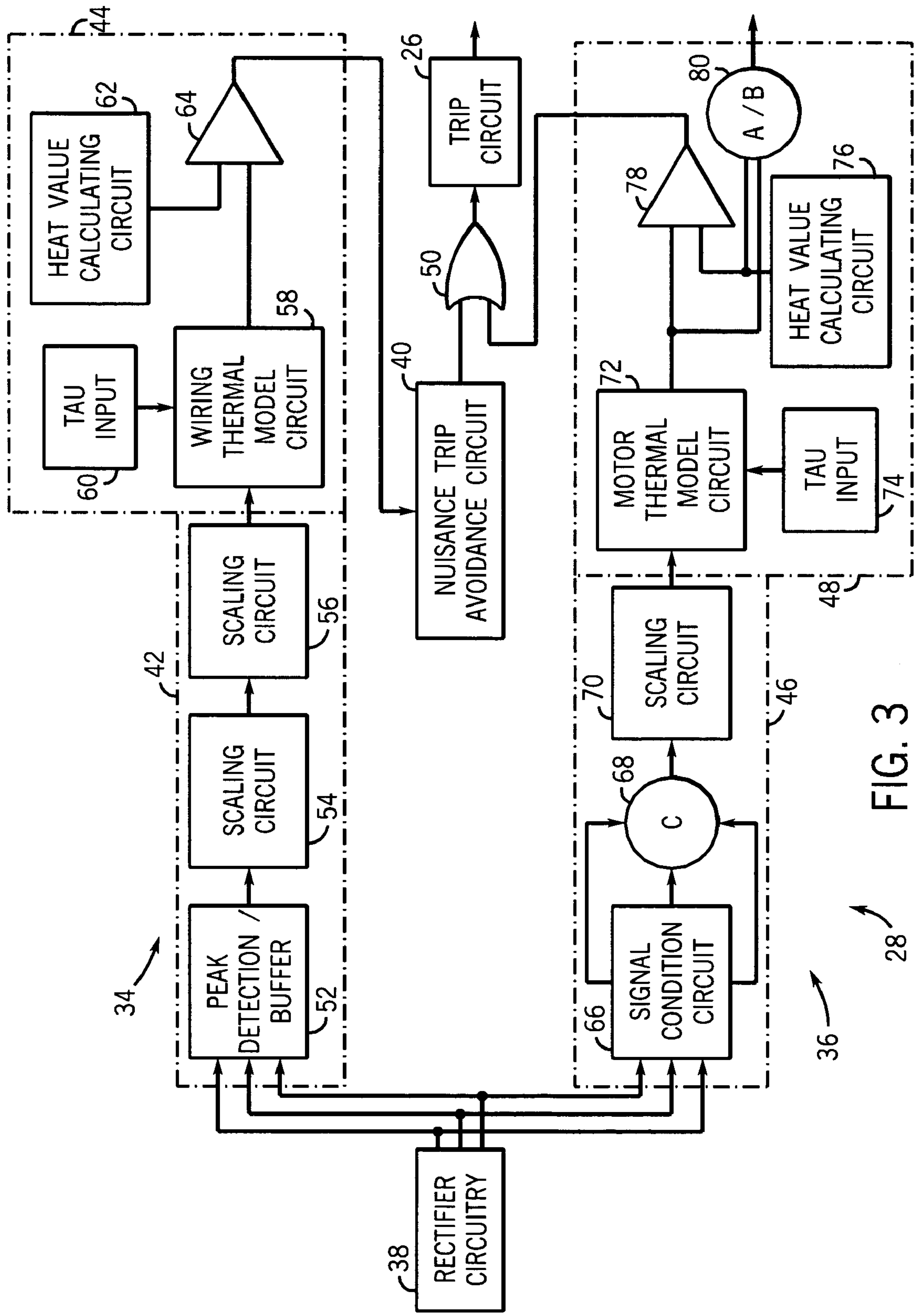
FIG. 3 is a diagrammatical representation, providing additional detail, of certain of the circuitry illustrated in FIG. 2.

A present implementation of the circuitry illustrated generally in FIG. 2 is shown in FIG. 3. As noted above, the wire protection path 34 and the motor protection path 36 are coupled to the rectifier circuitry 38 which receives signals from the current sensors. The wire protection path 34 then includes peak detection/buffer circuitry 52, scaling circuitry 54, and further scaling circuitry 56. Implementations of the illustrated circuitry are more fully illustrated in FIG. 4 discussed below.

Based upon the peak detected current, which is scaled by circuitry 54 and 56, the wire thermal protection circuitry 44 receives a scaled current input and models wiring heating via wiring thermal modeling circuitry 58. Circuitry 58 estimates heating of the wiring that supplies power to the load based upon an assumed thermal constant or "τ" as indicated at reference numeral 60 in FIG. 3. As will be appreciated by those skilled in the art, the value of τ can be used as the basis for a logarithmic heating function that relates current to the temperature of the wiring. A heat value calculation circuit 62, then, estimates a desired or rated temperature or heat value for the wiring. The modeled wiring temperature and the heat value calculation circuit temperature are then compared at a comparator 64. When the estimated or modeled wiring temperature approaches or exceeds the desired wiring temperature, a trip signal is generated by the comparator 64. This trip signal is, however, fed to the nuisance trip avoidance circuitry 40 prior to being applied to the "OR" device 50. Thus, nuisance trips based upon higher peak occurrence do, for example, to motor asymmetries, are avoided.

The motor protection path 36 includes signal conditioning circuitry 66 that receives input from the rectifier circuitry 38. The signal conditioning circuitry 66 is also described in greater detail below with reference to FIG. 4 in a present implementation. Based upon conditioning provided by the circuitry 66, output signals are compared at a comparator 68, to produce a single output signal which is scaled by scaling circuitry 70. The scale signal is then applied to a motor thermal modeling circuitry 72 of the motor thermal protection circuitry 48. In a manner similar to that of the wiring thermal modeling circuitry 58, the motor thermal modeling circuitry 72 estimates heating of the load based upon and assumed thermal time constant τ. The thermal time constant is input as indicated at reference numeral 74. As will be appreciated by those skilled in the art, different thermal time constants may be provided for different loads, i.e., different motors having different ratings. The resulting modeled heating is then compared to anticipated or desired heating computed by a heat (trip) value calculation circuit 76. The computed trip value is itself computed based upon the rated full load current for the motor coupled to the circuitry. Based upon this comparison, performed by a comparator 78, an output or trip signal is generated that is applied to the "OR" device 50. As also illustrated in FIG. 3, a reporting or indicator signal is generated by a comparator 80 that is a ratio of the modeled temperature to the desired temperature. This signal may be applied to downstream circuitry, such as to remote control or monitoring circuitry 22 (see FIG. 1). The output signal may provide an indication of motor heating as a function of the desired or rated heating.

Figure 4:
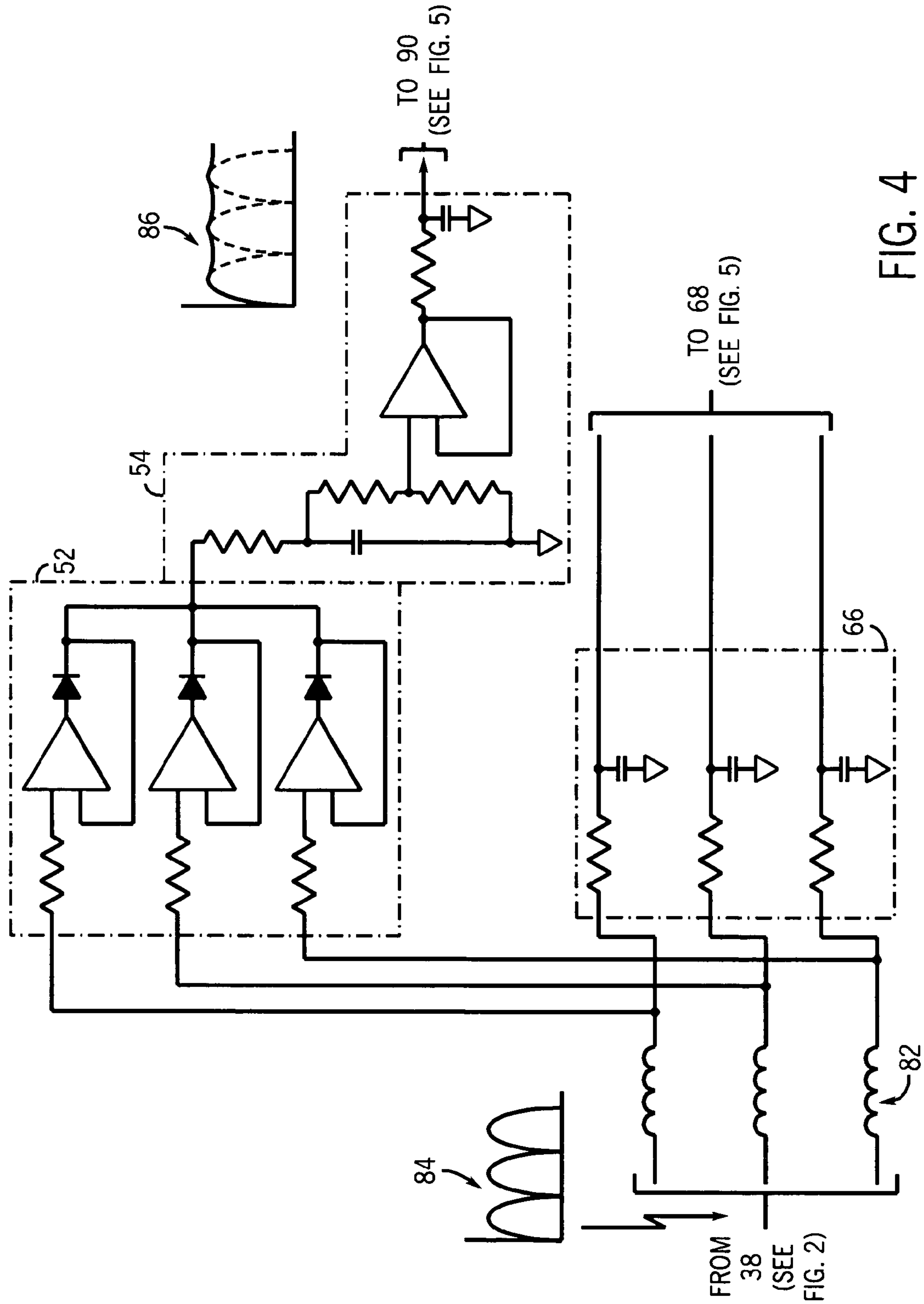
FIG. 4 is a diagrammatical representation of electrical circuitry for conditioning signals in the arrangements of FIGS. 2 and 3.

FIG. 4 is diagrammatical illustration of certain of the upstream circuitry for signal conditioning illustrated in FIG. 3. In particular, as illustrated in FIG. 4, inputs from the current sensors may be applied to inductors 82 (if appropriate) and then to the peak detection/buffer circuitry 52 and to the signal condition circuitry 66. The peak detection/buffer circuitry 52 includes a series of resistors, operation amplifiers, and diodes that serve to buffer the input signals and provide a single peak output applied to the scaling circuitry 54. Scaling circuitry 54 affectively scales the output of the peak detection/buffer circuitry 52, which may be on the order of 24 VDC, producing a scaled output of 0 to 5 VDC. The circuitry 52 and 54 affectively account for signal degradation that may occur at higher currents. That is, in certain cases, and depending upon the types of current sensors used, signal degradation may occur due to saturation of the sensor components. The circuitry permits the use of such sensors, however, despite the considerably extended current range of the protection device as described herein. As will be appreciated by those skilled in the art, for example, each current transformer will produce waveforms similar to those illustrated by the graphical representation 84 in FIG. 4. Output of the peak detection/buffer circuitry 52 and scaling circuitry 54 will, however, provide a slightly rippled output waveform as indicated by the graphical representation of 86 in FIG. 4.

The signal conditioning circuitry 66 illustrated in FIG. 4 comprises a series of resistors and capacitors. The circuitry permits for reduction of noise due to electromagnetic interference, as well as protection from overdriving analog 2-digital converters of the motor thermal protection circuitry 48. In a present embodiment, the signal conditioning circuitry 66 produces output signals ranging from 0 to 5 VDC.

In a present embodiment, the circuitry illustrated in FIG. 4 is provided on a first printed circuit board, while a second print circuit board supports the scaling circuitry 56, comparator circuitry 68, scaling circuitry 70, and the wiring and motor thermal modeling circuitry (see, e.g., FIG. 3). Any other suitable construction or topography may, of course, be employed. Indeed, the present device is particularly well-suited for application with and mounting in close proximity to a load to which power is applied and which is protected by the circuitry. Such configurations, which may be referred to as "on-machine" configurations, provide for application of power adjacent to the load, while providing the highly-adaptive control and protection functions of networked control systems. The present techniques are not, however, limited to on-machine implementations.

Figure 5:
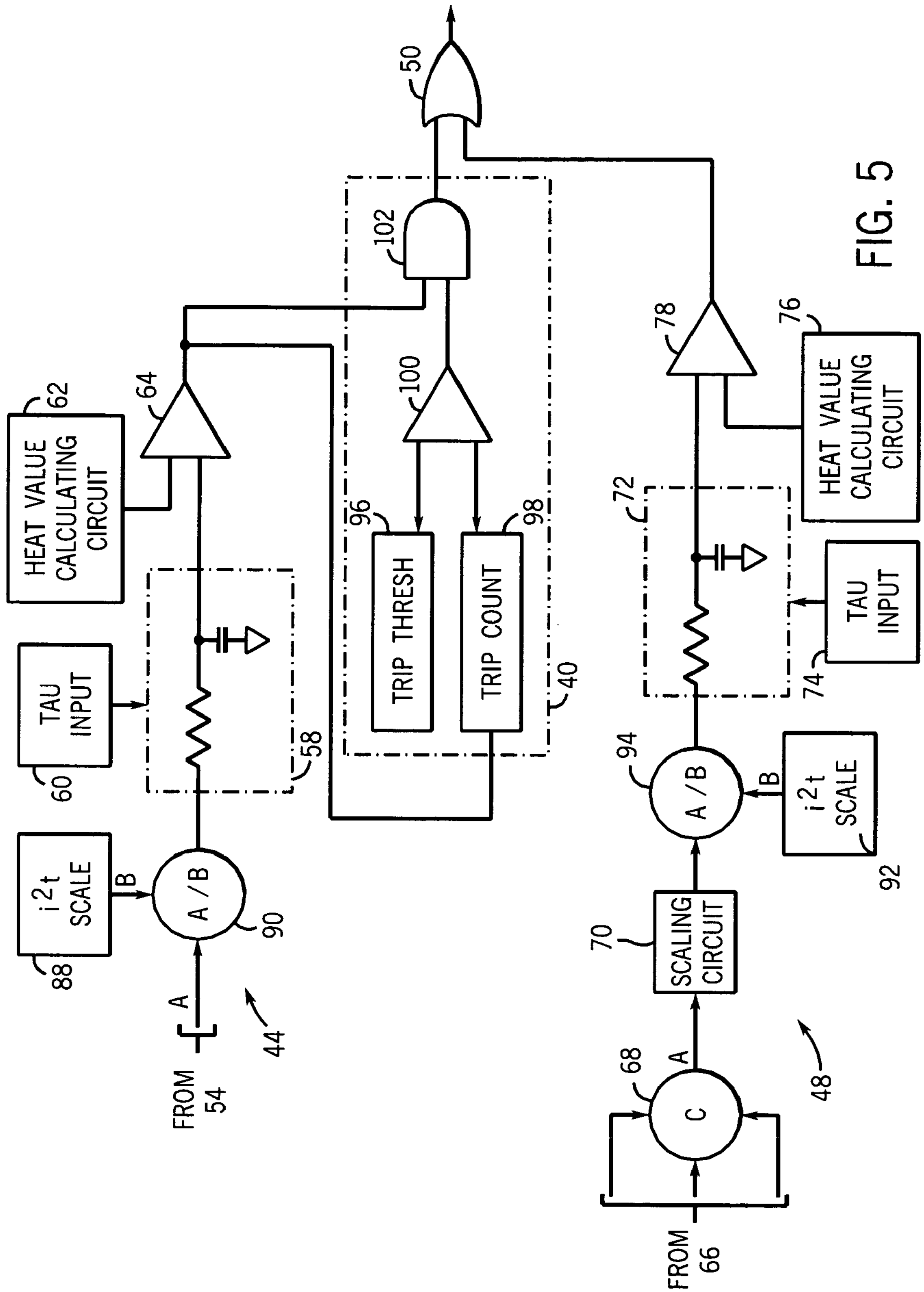
FIG. 5 is a diagrammatical representation of wire and motor protective circuitry for use in the arrangements of FIGS. 2 and 3.

The foregoing circuitry is illustrated in somewhat greater detail in FIG. 5. As noted above, the circuitry of FIG. 5 is, in a present embodiment, populated on a single control circuit board. The wire thermal protection circuitry 44 receives input from signal conditioning circuitry that, in turn, receives input from the scaling circuitry 54 discussed above. In a present implementation, scaling is performed for an $i^2t$ inverse time modeling algorithm as indicated at reference numeral 88. Scaling is performed by a scaling divisor 90 which generates a ratio of the signal received from scaling circuitry 54 and the input from the $i^2t$ scaling module 88. This scaled input is then applied to the wiring thermal modeling circuitry 58. As noted above, based upon the modeled heating of the wiring (e.g., standardized 16 AWG), as dictated by the time constant τ inputted reference numeral 60, and the comparison performed by comparator 64, a trip signal may be generated based upon wire heating.

Similarly, output from the signal conditioning circuitry 66 discussed above is applied to comparator 68 of the scaling circuitry 70. Again based upon an $i^2t$ scaling modules 92, a scaling signal is applied to a scaling divisor 94 which generates a scale signal which is a ratio of the inputs. This scale signal is then applied to the motor thermal modeling circuitry 72. Based upon the time constant τ input as indicated at reference numeral 74, and the comparison made by comparator 78, then, a trip signal may be similarly generated based upon modeled motor heating.

As noted above, to permit the use of certain types of current sensors, and to account for asymmetric transients in the load (e.g., upon starting) nuisance trip avoidance circuitry 40 is provided. In the implementation illustrated in FIG. 5, a circuitry includes a trip threshold input which is a number of counts, such as 20 counts. A trip count input 98 is also provided that is a running count of the number of consecutive trip signals generated by the comparator 64. In a present implementation, then, samples of the trip signals generated by comparator 64 are accumulated based upon one ms interrupts. If the value measured is above a predetermined constant value, such as 9 times the permitted wire current, the trip count 98 is incremented. This incremented value is then compared to the trip threshold, such as the constant of 20 counts by a comparator 100. Thus, if 20 counts above the desired threshold are accumulated, an enable signal is output by the comparator 100 to and "AND" device 102. The nuisance trip avoidance circuitry 40, thus, requires that a constant elevated current level is detected for the programmed time (e.g., 20 ms) and that the trip signal from comparator 64 is present in order to generate a trip output to be applied to the "OR" device 50. The nuisance trip avoidance circuitry 40 permits the use of a $\tau$ value input (see reference numeral 60) that provides for fast tripping and the use of certain types of current sensors. The circuitry also facilitates use of a threshold enabling an extended range of (instantaneous) overload tripping with the use of the same contactor for both large and small loads.

In particular, the present arrangement facilitates the modeling of heating for both overload protection and instantaneous tripping. Such tripping is provided by the algorithms employed and implemented by the foregoing circuitry, which may be graphically illustrated as shown in FIG. 6. FIG. 6 illustrates two separate ranges of operation, including a first range 106 designed to protect wiring and the load based upon conventional $i^2t$ inverse time algorithms as generally known in the art. However, the algorithms here are implemented by the same devices for a number of different types and sizes of loads. A second, extended range 108 is provided for higher current level tripping. The single or unified curve of the extended range 108 is typically different than the curves that would be extended from the curves of range 106.

The graphical illustration of the ranges 106 and 108 of FIG. 6 are illustrated graphically along a horizontal axis 110 that represents current, and a vertical axis 112 that represents time. A boundary between ranges 106 and 108, as indicated generally at reference numeral 114 may be defined by applicable electrical codes, such as at a level of 6–10 times the full load current (FLC) for a particular class of motor. The multiple of the FLC defining the boundary 114 may be based upon the locked rotor current, for example. An upper limit 116 for the extended range 108 is defined by the rating of the instantaneous trip device 24 illustrated in FIG. 1 above. While the instantaneous trip device is, in conventional systems, typically selected as a circuit breaker designed to operate at a somewhat higher multiple of the FLC than the overload trip threshold, typically on the order of 13 times FLC, it will be noted that in the present arrangement, because the instantaneous trip devices selected based upon the highest FLC of devices to be serviced by the protection circuitry, the multiple of the FLC for smaller loads will be considerably higher than in conventional devices. The foregoing circuitry, thus, provides instantaneous tripping to accommodate for this considerably extended range of operation. The particular size and rating for the instantaneous trip device (i.e. circuit breaker) may be selected based upon additional factors, such as minimization of the number of different components in the systems, and so forth, and may provide a multiple of the highest FLC greater or less than 13× (e.g. 20×).

In a typical implementation, standard curves defining the relationships of range 106 will be provided in a conventional manner. Such curves, which are typically defined by a class (e.g., class 10) provide for motor thermal protection up to the desired multiple of a full load of FLC. An extended operation curve, indicated at reference numeral 120 in FIG. 6, then, defines operation of the device above the threshold 114, and provides for protection of the wiring in the event of a rapid but high current trip event. As will be appreciated by those skilled in the art, the algorithm resulting in the curve 120 will typically not model the trip current performance in a manner similar to the extension of the curves in range 106. For example, in a case of a class 10 device, the extension of the corresponding curve from range 106 may be indicated by the curve of reference numeral 122. However, the actual curve 120 may be shallower than the ideal $i^2t$ curve extended as indicated at reference numeral 122. However, tripping is provided in the extended range by the circuitry described above to protect wiring above the threshold 114.

The nature of the operation of the foregoing circuitry, as graphically illustrated in FIG. 6 may be summed up through series of considerations. First, the operating range 106 is defined by multiple curves based upon the motor FLC. Such curves are typically dictated by class standards. The protection within this region or range is afforded for both the motor and the wiring. The circuitry thus recognizes the occurrence of overload conditions and opens the contactor 26 under the control of the control circuitry 28 (see, e.g., FIG. 1).

Within the operating range 108, on the other hand, a single curve or relationship is provided for tripping. Protection is thus afforded for the smallest wire in the motor branch circuitry, which in a present embodiment is selected as 16 AWG. The extended range similarly recognizes overload conditions which may be adversely affect the wire by such heating and causes opening of the contactor.

The following is an example the extended range operation of the present technique. A single device, power and protection may be provided for a range of motors of a frame size C. The present technique provides for accommodating motors from approximately 2 Hp to approximately 10 Hp, having minimum FLC ratings of 3.2 and maximum FLC ratings of 16 A respectively. Current sensing hardware, including current sensors, amplifiers and analog-to-digital converters, are provided for a range of operation to approximately 8 times the maximum of FLC (8×16 A =128A). That is, the unit is designed to operate for overload conditions of up to 16 A of the rated device, or an RMS current of 128A, with a peak of approximately 180 A ($128\times\sqrt{2}$). Continuing with this example, the rating of approximately 180 A will correspond to the threshold 114 of FIG. 6. Tripping within the first range 106, however, will be determined by the circuitry described above and upon the time constants and curves implemented by the circuitry.

To provide for the extended range, an instantaneous trip device is selected based upon the highest FLC of the loads that can be accommodated by the circuitry, in this example 16 A. That is, the limit 116 illustrated in FIG. 6 is effectively a fixed instantaneous trip level as defined by the instantaneous trip device. In the current example the device may be selected for instantaneous tripping at a multiple of the highest FLC of the serviced devices, such as at 325 A RMS. The peak operating condition, then, for this device would be approximately 460 A ($325\times\sqrt{2}$). It will be noted that in the foregoing example, while a relatively standard multiple of the FLC of the larger serviced device is provided by the instantaneous trip device (approximately 20× the FLC of the largest frames C device, e.g., a 10 Hp motor), a much higher multiple results for the smaller devices, on the order of 100× the FLC of the smaller device rated at 3.2 A (325 A/3.2 A). However, due to the modeling and tripping provided by the control circuitry and contactor described above, such extended ranges may be afforded and multiple devices of substantially different current ratings may be serviced by the same hardware and software.

In a current implementation, for example, two different frames of motors (actually provided in the same physical frame) denoted frame A and frame B are serviced by a single device with FLC ranges of 0.5 A to 5.5 A. A second protective device is offered for a range of loads in a frame C, ranging from 3.2 A to 16 A as in the example discussed above. T ($\tau$) values (provided in terms of $\tau$ times the sample period of 1 ms are set at values of 33, 78 and 262 for the three frames A, B and C, although such values are highly dependent upon the time constant, sample rate scaling, trip levels, and other system and component design factors.

The methodology for design of the present protective devices, and further implementation is set forth generally in FIG. 7. The implementation logic, indicated generally by reference numeral 124, may begin with selection of a contactor, such as contactor 26 illustrated in FIG. 1, based upon the highest instantaneous trip and full load current rating for devices to be serviced by the protective circuitry. As summarized above, although a range of devices will be serviced by the protective circuitry, the use of the highest instantaneous trip and full load current rating for the family of devices permits implementation of an extended range algorithm that effectively protects wiring used for branch circuitry coupled to the load.

As indicated at step 128, then, a program or model is implemented by class for overload for a thermal overload tripping. Such programming is provided in the circuitry described above, including the motor thermal protection circuitry. The modeling provides for tripping below a threshold typically set by reference to an $i^2t$ inverse time algorithm for a class of loads based upon a desired multiple, such as from 6 to 10 times the FLC for the load. As indicated at step 130, the program or model is based upon the algorithm for wire and motor protection, typically the class standard algorithm. At the same time, nuisance trip avoidance is provided as indicated at reference numeral 132, to accommodate for asymmetries in the load performance, typically permitting higher currents upon start up of a motor.

As indicated at step 134 in FIG. 7, instantaneous trip is then provided within the extended range discussed above. As also discussed above, the instantaneous trip is typically provided based upon protection of wiring, with standard wiring parameters being employed in a present embodiment, such as to protect 16 AWG wire. Reference numeral 136 indicates the algorithm 2 that is employed in this trip regime for wire protection as discussed above.

As noted above, the protective circuitry may be employed in a network setting in conjunction with remote control and monitoring circuitry, such as circuitry 22 illustrated in FIG. 1. Where such circuitry is provided, and due to the interfacing of the control circuitry 28 with the network, remote reset capabilities are afforded, as indicated at reference numeral 138 in FIG. 7. Such remote resetting facilitates monitoring and continued operation of the devices, as opposed to traditional resetting which typically requires physical and manual presence at the point of resetting. As noted above, because the foregoing circuitry is very well suited to mounting at a load location, or immediately adjacent to the locating of a load, such remote resetting is particularly advantageous as the loads may be widely displaced from a central monitoring location.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for controlling operation of an electric motor comprising:
- a circuit interrupter for selectively applying and interrupting electrical power to an electric motor; and
- a control circuit coupled to the circuit interrupter, the control circuit being configured to cause the circuit interrupter to interrupt power to the electric motor based upon an $i^2t$ inverse time algorithm in a first current range, and based upon a second algorithm in a second current range higher than the first range.

2. The system of claim 1, wherein the first range extends to approximately 6–10 times the full load current rating for a desired class of motors.

3. The system of claim 1, wherein the first range is based upon the locked rotor current for a motor to which the system is configured to be coupled.

4. The system of claim 1, further comprising an instantaneous trip device for interrupting current to the motor at a desired maximum current level.

5. The system of claim 4, wherein the second algorithm is configured to extend an upper limit of current for interruption by the circuit interrupter to a rating of the instantaneous trip device.

6. A system for controlling operation of an electric motor comprising:
- a circuit interrupter for selectively applying and interrupting electrical power to an electric motor;
- a control circuit coupled to the circuit interrupter, the control circuit being configured to cause the circuit interrupter to interrupt power to the electric motor based upon an $i^2t$ inverse time algorithm in a first current range, and based upon a second algorithm in a second current range higher than the first range; and
- an instantaneous trip device for interrupting current to the motor at a desired maximum current level.

7. The system of claim 6, wherein the second algorithm is configured to extend an upper limit of current for interruption by the circuit interrupter to a rating of the instantaneous trip device.

8. The system of claim 6, wherein the first range extends to approximately 6–10 times the full load current rating for a desired class of motors.

9. The system of claim 6, wherein the first range is based upon the locked rotor current for a motor to which the system is configured to be coupled.

10. A method for controlling operation of an electric motor comprising:
- applying electrical power to an electric motor; and
- interrupting power to the electric motor based upon an $i^2t$ inverse time algorithm in a first current range, and based upon a second algorithm in a second current range higher than the first range.

11. The method of claim 10, wherein the first range extends to approximately 6–10 times the full load current rating for a desired class of motors.

12. The method of claim 10, wherein the first range is based upon the locked rotor current for the motor.

13. The method of claim 10, further comprising interrupting power to the motor via an instantaneous trip device at a desired maximum current level.

14. The system of claim 13, wherein the second algorithm is configured to extend an upper limit of current for interruption by the circuit interrupter to a rating of the instantaneous trip device.

15. A method for controlling operation of an electric motor comprising:

applying electrical power to an electric motor; and interrupting power to the electric motor via a circuit interrupter based upon an $i^2t$ inverse time algorithm in a first current range, and based upon a second algorithm in a second current range higher than the first range; and interrupting power to the motor via an instantaneous trip device at a desired maximum current level.

16. The method of claim 15, wherein the first range extends to approximately 6–10 times the full load current rating for a desired class of motors.

17. The method of claim 15, wherein the first range is based upon the locked rotor current for the motor.

18. The system of claim 15, wherein the second algorithm is configured to extend an upper limit of current for interruption by the circuit interrupter to a rating of the instantaneous trip device.

19. A computer program for controlling operation of an electric motor comprising:

a machine readable medium; and computer readable code stored on the machine readable medium, the code including instructions for applying electrical power to an electric motor, and interrupting power to the electric motor based upon a first an $i^2t$ inverse time algorithm in a first current range, and based upon a second algorithm in a second current range higher than the first range.

* * * * *